United States Patent
Bhattacharyya et al.

(10) Patent No.: US 9,824,607 B1
(45) Date of Patent: Nov. 21, 2017

(54) BRAIN MACHINE INTERFACE FOR EXTRACTING USER INTENTIONS WITH SUBLIMINAL DECISION-RELATED STIMULI

(71) Applicant: HRL Laboratories, LLC, Malibu, CA (US)

(72) Inventors: Rajan Bhattacharyya, Sherman Oaks, CA (US); Ryan M. Uhlenbrock, Calabasas, CA (US); David W. Payton, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 305 days.

(21) Appl. No.: 13/748,494

(22) Filed: Jan. 23, 2013

Related U.S. Application Data

(60) Provisional application No. 61/589,748, filed on Jan. 23, 2012.

(51) Int. Cl.
    *G06N 5/04*      (2006.01)
    *G09B 19/00*     (2006.01)

(52) U.S. Cl.
     CPC ............. *G09B 19/00* (2013.01); *G06N 5/04* (2013.01)

(58) Field of Classification Search
     CPC .. G06F 9/4443–9/4448; G06F 3/048–3/04897
     USPC ................................................. 715/705–715
     See application file for complete search history.

(56) References Cited

U.S. PATENT DOCUMENTS

| | | | |
|---|---|---|---|
| 5,638,826 A * | 6/1997 | Wolpaw et al. | 600/544 |
| 8,692,769 B1 * | 4/2014 | Bendickson et al. | 345/157 |
| 2002/0077534 A1 * | 6/2002 | DuRousseau | 600/300 |
| 2008/0235164 A1 * | 9/2008 | Tian et al. | 706/12 |

OTHER PUBLICATIONS

Wong, Philip S. et al.; "Conscious and nonconscious processes: An ERP index of an anticipatory response in a conditioning paradigm using visually masked stimuli"; 1994; Cambridge University Press; Psychophysiology, 31; pp. 87-101.*

(Continued)

*Primary Examiner* — Lut Wong
(74) *Attorney, Agent, or Firm* — Tope-McKay & Associates

(57) ABSTRACT

A brain-machine interface for extracting user action intentions within a continuous asynchronous interactive environment is presented. A subliminal stimulus module generates contextually appropriate decision-related stimuli that are unobtrusive to a user. An altered perceptual experience module modifies a user's sensation of the interactive environment based on decision-related stimuli generated from the subliminal stimulus module. A brain monitoring module assesses the user's brain activity in response to the decision-related stimuli and to determine whether an action within the asynchronous interactive environment is intended by the user. Finally, an action is taken based on explicit user input, the user's brain activity in response to the decision-related stimuli, or a combination thereof. The decision-related stimuli can be visual stimuli, audio stimuli, tactile stimuli, or olfactory stimuli, any be a repeated signal having a start and a stop, where the start and stop are selected to minimize cognitive load on a user.

33 Claims, 5 Drawing Sheets

FIG. 4

(56) References Cited

OTHER PUBLICATIONS

Brazdil, Milan et al.; "Effect of subthreshold target stimuli on event-related potentials"; 1998; Elsevier Science Ireland Ltd.; Electroencephalography and clinical Neurophysiology 107; pp. 64-68.*

Chalfoun, Pierre et al.; "Subliminal Cues While Teaching: HCI Technique for Enhanced Learning"; 2011; Hindawi Pulbishing Corporation; Advances in Human-Computer Interaction; pp. 1-15.*

Rezai et al ("Brain Signals: Feature Extraction and Classification Using Rough Set Methods" 2005).*

Chalfoun et al ("Subliminal Cues While Teaching: HCI Technique for Enhanced Learning" 2011).*

Chalfoun et al ("Subliminal priming enhances learning in a distant virtual 3D Intelligent Tutoring System" 2008).*

Bradberry, T.J. and Gentili, R.J. and Contreras-Vidal, J.L., (2010), "Reconstructing three-dimensional hand movements from noninvasive electroencephalograhic signals," Journal of Neuroscience, 30(9), p. 3432.

Cowell, A. and Hale, K. and Berka, C. and Fuchs, S. and Baskin, A. and Jones, D. and Davis, G. and Johnson, R. and Fatch, R. (2007) "Construction and validation of a neurophysio-technological framework for imagery analysis," Human-Computer Interatioin, Interaction Platforms and Techniques, p. 1096-1105.

Polich, John, "Clinical application of the P300 event-related brain potential," Physical medicine and rehabilitation clinics of North America 15.1 (2004): 133.

Gerson, A.D. and Parra, L.C. and Sajda, P. (2006) "Cortically coupled computer vision for rapid image search," IEEE Transactions on Neural Systems and Rehabilitation Engineering, 14(2), 174-179.

Bell, C.J. and Shenoy, P. and Chalodhorn, R. and Rao, R.P.N., (2008) "Control of a humanoid robot by a noninvasive brain-computer interface in humans," Journal of Neural Engineering, vol. 5, p. 214.

Furdea, A. and Halder, S. and Krusienski, DJ and Bross, D. and Nijboer, F. and Birbaumer, N. and Kubler, A. (2009) "An auditory oddball (P300) spelling system for brain-computer interfaces," Psychophysiology, 46(3), 617-625.

Luck, Steven J, "An introduction to the event-related potential techinque," 2005; pp. 51-96, 225-264.

* cited by examiner

US 9,824,607 B1

BRAIN MACHINE INTERFACE FOR EXTRACTING USER INTENTIONS WITH SUBLIMINAL DECISION-RELATED STIMULI

STATEMENT REGARDING FEDERALLY SPONSORED RESEARCH OR DEVELOPMENT

This invention was made with government support under Contract # N00173-09-C-6009 awarded by the Naval Research Laboratory. The government has certain rights in the invention.

CROSS-REFERENCE TO RELATED APPLICATIONS

This is a non-provisional application of U.S. Provisional Application No. 61/589,748, filed on Jan. 23, 2012, entitled, "Subliminally Time-Locked User Interface."

FIELD OF INVENTION

The present invention relates to human/computer interfaces and, more particularly, to a human/computer interface that provides a user with context-appropriate, subliminal, decision-related stimuli that aid a user in making appropriate decisions while minimizing user distraction.

BACKGROUND OF INVENTION

Human/computer interfaces take many forms and serve a wide variety of purposes. A common example of a human/computer interface is the mouse/keyboard/computer screen interface, where a graphical user interface is used for the display of information to a user. Most commonly used human/computer interfaces require a user to explicitly input information to facilitate data entry and decision-making.

Recently, interest has grown in developing human/computer interfaces that take advantage of other means to obtain user input. For example, one system developed by Bradberry, T. J. and Gentili, R. J. and Contreras-Vidal, J. L., in "Reconstructing three-dimensional hand movements from noninvasive electroencephalographic signals," Journal of Neuroscience, 30(9), p. 3432 (2010), which is incorporated by reference as though fully set forth herein, involves an asynchronous brain-machine interface (BMI) for the control of an effector, and uses a linear regression classifier to decode electroencephalogram (EEG) signals to control the two and three-dimensional movement of a cursor. Results show low correlation with the goal of the movement ($R^2<0.4$) and indicate poor performance, which is common in continuously decoded tasks using EEG signals of brain state.

Another example of a system involving an asynchronous BMI task is in the field of image searching. Non-stimulus driven signals have been used for defining temporal windows for event related potential (ERP) analysis. The system, developed by Cowell et al., uses the onset of a user's eye fixation (as indicated by a predefined length of time where a single location is fixated by the eyes) (see Cowell, A. and Hale, K. and Berka, C. and Fuchs, S. and Baskin, A. and Jones, D. and Davis, G. and Johnson, R. and Fatch, R., "Construction and validation of a neurophysio-technological framework for imagery analysis," Human-Computer Interaction. Interaction Platforms and Techniques, p 1096-1105, (2007) which is incorporated by reference as though fully set forth herein). This system improves upon the prior art since the definition of a temporal window uses subliminal stimulation times as the onset for ERP analysis. This provides a more accurate and reliable time for onset, whereas fixation time depends on measuring and processing eye position accurately, which is subject to drift, eye blinks, and other artifacts. Moreover, the statistics of fixation time between users are different. Hence, for optimal performance the prior art requires either the training of an additional classifier to learn a user's fixation statistics, or the training of the user to conform to predefined limits when performing the asynchronous BMI task. The selective use of the BMI is not supported by the prior art without artificially constraining the natural pattern of eye movements and fixations of the user. Hence, every fixation stimulus is decoded regardless of its relevance to the task at hand.

Another human/computer interface uses rapid serial visual presentation (RSVP) with a synchronous BMI task. RSVP can be used with a single stimulus presented at a time, such as in object classification, as demonstrated by Gerson et al. (see Gerson, A. D. and Parra, L. C. and Sajda, P., "Cortically coupled computer vision for rapid image search," IEEE Transactions on Neural Systems and Rehabilitation Engineering, 14(2), 174-179 (2006), which is incorporated by reference as though fully set forth herein). Another class of application of RSVP uses multiple stimuli, such as in navigation applications, where an environment is navigated by decoding the brain's response to arrows that are flashed. The incorporation of additional stimuli increases the perceptual load on the user, in this case, the complexity of the visual scene during navigation. In addition, the use of multiple stimuli limits the possible commands that can be decoded using RSVP because of increased complexity of the visual scene; and the length of the task increases linearly with the number of stimuli that must be presented for selection.

Other examples of human/computer interfaces, such as those developed by Bell et al. and Furdea et al., are used for the application of spatial goal selection in an image. (see Bell, C. J. and Shenoy, P. and Chalodhorn. R. and Rao, R. P. N., "Control of a humanoid robot by a noninvasive brain-computer interface in humans," Journal of Neural Engineering, Vol 5, p 214 (2008); and Furdea, A. and Halder, S. and Krusienski, D J and Bross, D. and Nijboer, F. and Birbaumer, N. and Kubler, A., "An auditory oddball (P300) spelling system for brain-computer interfaces," Psychophysiology, 46(3), 617-625 (2009), both of which are incorporated by reference as though fully set forth herein).

These are examples of selecting a target from a discrete set of locations using RSVP with multiple stimuli. RSVP requires the focused attention by the user on the stimuli presented (otherwise they can be missed) and requires the continuous engagement of brain state for the BMI task, resulting in fatigue.

A need currently exists for a human/computer interface that includes brain monitoring such as EEG signal analysis, and also provides context-relevant decision-related stimuli in a manner that is minimally disruptive to a user's attention (requires a low mental/cognitive load), yet is effective in assisting the user in making useful decisions. The present invention solves this need as described in the sections below.

SUMMARY OF THE INVENTION

In one aspect, the present invention provides a brain-machine interface for extracting user action intentions within a continuous asynchronous interactive environment. The interface comprises a subliminal stimulus module for generating contextually appropriate decision-related stimuli that are unobtrusive to a user. An altered perceptual experience module modifies a user's sensation of the interactive environment based on decision-related stimuli generated from the subliminal stimulus module. A brain monitoring module assesses the user's brain activity in response to the decision-related stimuli and to determine whether an action within the asynchronous interactive environment is intended by the user.

In a further aspect, the decision-related stimuli are selected from a group consisting of visual stimuli, auditory stimuli, tactile stimuli, and olfactory stimuli.

In a still further aspect, the user stimuli is a visual stimuli selected from a group consisting of blurring a relevant portion of a scene, pointers indicating a relevant portion of a scene, dots indicating a relevant portion of a scene, altering the color scheme of a relevant portion of an image.

In a yet further aspect, the decision-related stimuli has a start point and a stop point, where the start point and stop point are contextually appropriate.

In another aspect, the decision-related stimuli are repeatedly presented between the start point and stop point.

In still another aspect, the decision-related stimuli have a level of obtrusiveness to the user, and wherein the level of obtrusiveness is varied according to the context of the decision-related stimuli.

In yet another aspect, the decision-related stimuli have a type, and wherein the type of decision-related stimuli is varied according to the context.

In a further aspect, the brain monitoring module includes an electroencephalogram (EEG) to monitor a user's brain activity via an EEG signal.

In a yet further aspect, the brain monitoring module divides the EEG signal into time segments which are appropriate for monitoring the user's brain activity in response to the decision-related stimuli.

In another aspect, the brain monitoring module further includes a EEG decoder/classifier to determine whether an action within the asynchronous interactive environment is intended by the user.

In yet another aspect, the brain monitoring module further comprises an action generation module to invoke user actions within the asynchronous interactive environment when the user's brain activity indicates that a decision is made based on the decision-related stimuli.

In still further aspects, the various operations and aspects above are performed by acts in a brain-machine interface method for extracting user intentions within a continuous asynchronous interactive environment.

In yet further aspects, the various operations and aspects above are incorporated into computer-readable instructions stored on a non-transitory computer-readable medium to provide a brain-machine interface computer program product for extracting user intentions within a continuous asynchronous interactive environment.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
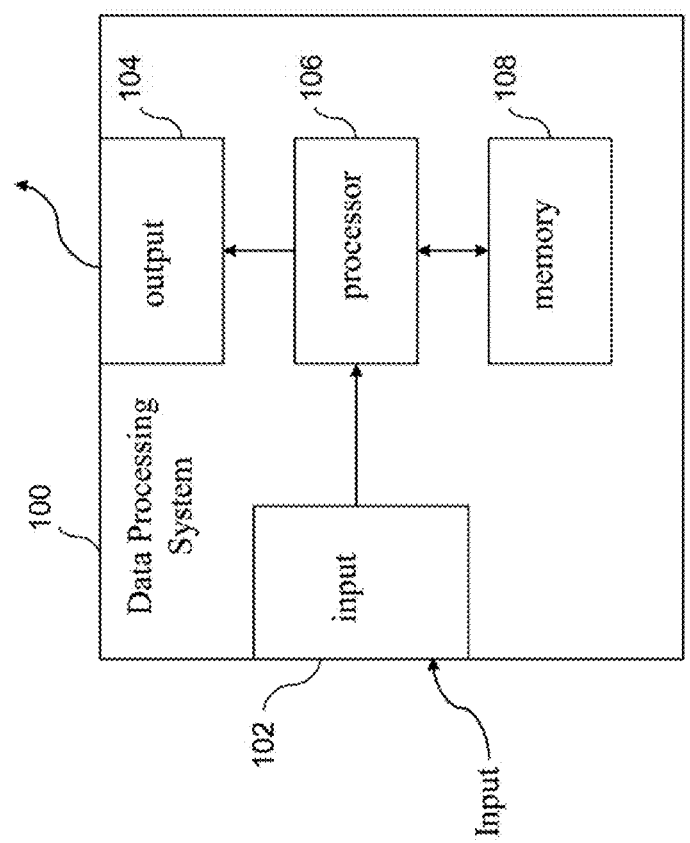
FIG. 1 is a block diagram depicting the components of a general-purpose data processing system for use with the present invention.

The present invention relates to human/computer interfaces and, more particularly, to a human/computer interface that provides a user with context-appropriate, subliminal, decision-related stimuli that aid a user in making appropriate decisions while minimizing user distraction. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification. (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of various principal aspects of the present invention is provided. Subsequently, specific details of the present invention are provided to give an understanding of the specific aspects.

(1) Principal Aspects

The present invention has three "principal" aspects. The first is a brain-machine interface for extracting user action intentions within a continuous asynchronous interactive environment. The brain-machine interface typically comprises a brain monitoring module such as an electroencephalogram (EEG) incorporated into a helmet-type device that is wearable by a user, along computing devices and other hardware for generating and presenting contextually appropriate decision-related stimuli that are unobtrusive to the user. The second principal aspect is a method, typically in the form of software, operating within the aforementioned hardware to provide the brain-machine interface functionality. The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of a general-purpose data processing system for use in conjunction with the present invention is provided in FIG. 1. The system 100 comprises an input 102 for receiving information from the user. The input 102 typically includes multiple "ports," to permit the receipt of EEG data as well as explicit user input to facilitate a decision-making process. An output 104 is connected with the processor for sending information to a display for the user as well as to other devices or other programs; e.g., to other software modules, for use therein. The input 102 and the output 104 are both coupled with a processor 106 (or processors), which may be a general-purpose computer processor or a specialized processor designed specifically for use with the present invention. The processor 106 is coupled with a memory 108 to permit storage of data and software that are to be manipulated by commands to the processor 106.

Figure 2:
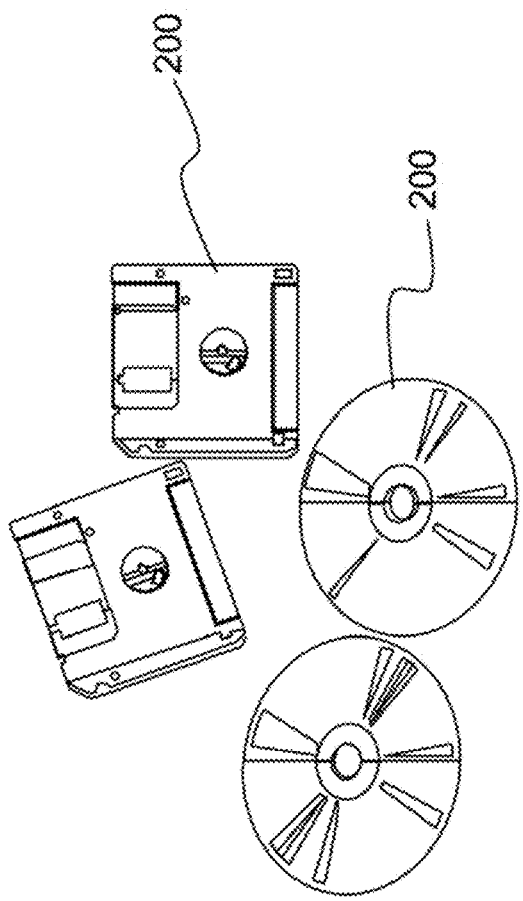
FIG. 2 is an illustration of a computer program product according to the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instructions stored on any compatible non-transitory computer-readable medium that are executable by a computer having a processor for causing the processor to perform the operations listed herein. The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored in the memory of a computer or on a computer-readable medium such as a floppy disk, a CD-ROM, or a flash drive.

(2) Specific Details (a) High-Level Component Description

Figure 3:
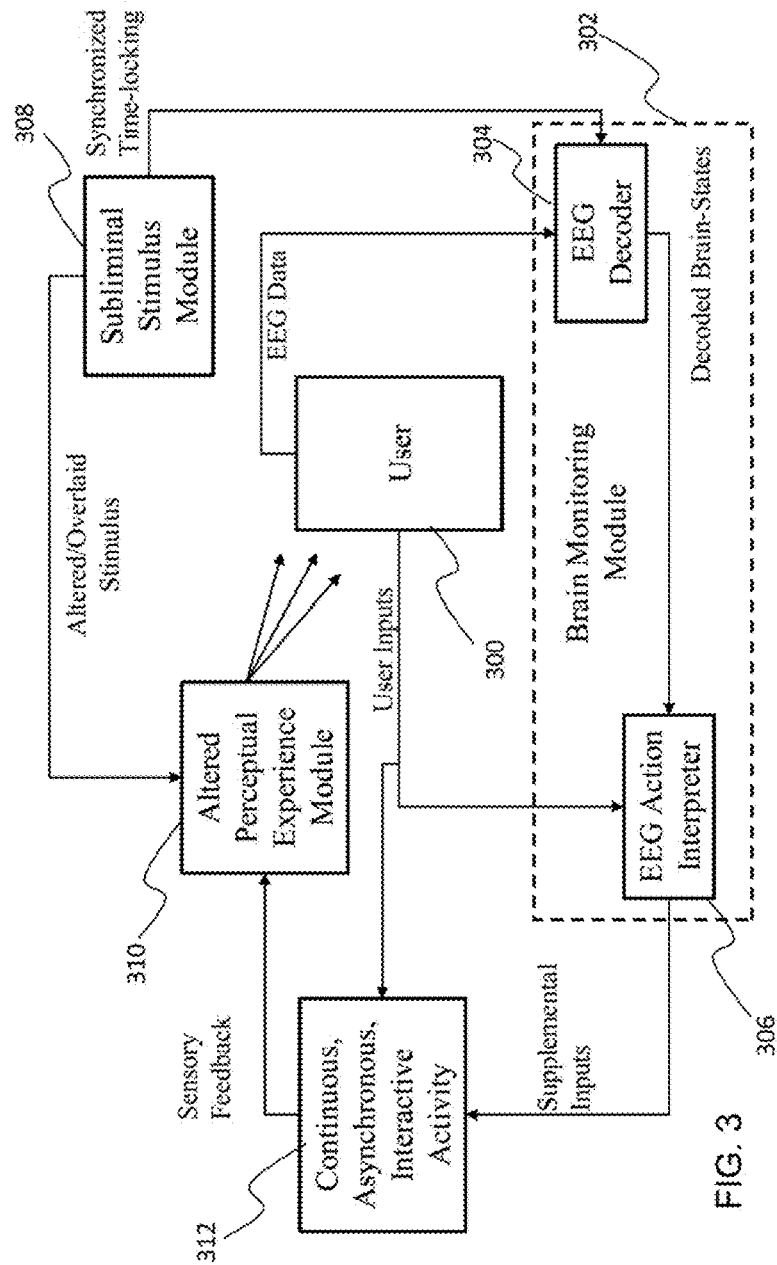
FIG. 3 is a flow chart depicting the interrelationship between various components of the present invention.

Descriptions of several of the high-level components of the invention are provided in this section. A flow chart depicting the interrelationships of the various components of the present invention is shown in FIG. 3. Interactions between these components will be described further below.

Activity: The present invention applies to situations where a user is engaged in a continuous, asynchronous, interactive activity such as exploring a three-dimensional environment or driving a car. The continuous, asynchronous aspect of the activity distinguishes it from other paradigms with discrete and/or timed events and stimuli. The interactivity means that a user can meaningfully engage in the activity independently and simultaneously with a brain-monitoring module, where the brain-monitoring module does not perform the entire task; rather it is supplementary to the task.

Altered Perceptual Experience Module 310: While engaged in the activity, the user experiences continuous sensory feedback, which could be visual, tactile, auditory, etc. An alteration to this sensory feedback with known timing properties is applied to slightly alter the user's perceived experience by the altered perceptual experience module. This alteration will not substantially detract from the user's ability to perform and experience the activity. For example, the alteration could be in a heads-up display, blurring or contrast distortion of an image, or an unobtrusive periodic sound.

Brain Monitoring Module 302: The brain monitoring module is a mechanism for analyzing and classifying the user's brain activity (e.g., electroencephalogram (EEG) signals) in order to determine whether an action is desired. In one example, the brain monitoring module includes an EEG decoder 304 for receiving live EEG data from the user and timing event information from the subliminal stimulus module. The EEG decoder 304 interprets EEG activity in relation to the timing events in order to recognize or classify one of several brain-states. The decoder can take advantage of ERP analysis, which has advantages over continuous-time decoding.

Subliminal Stimulus Module 308: The subliminal stimulus module generates the sensory alteration with known timing/synchronization properties, which could be periodic. In cases where the invention incorporates an electroencephalogram (EEG) signal monitor, timing information signals are sent to an EEG decoder in order to relate EEG data to the alterations perceived by the user in continuous time. This is the key to time-locking.

User: The user 300 is a human (engaged in an activity and perceiving the altered sensory experience from this activity) whose brain activity (e.g., EEG) is being analyzed. The user also interacts with the activity via inputs other than through EEG in a continuous, asynchronous manner. These user inputs could, for example, come from a manual input device, head tracker, eye tracker, steering wheel, pedal, joy stick, etc.

EEG Action Interpreter 306: This interprets the user's brain-state as determined by EEG decoding into supplemental inputs or controls to the activity, making use of any contextual information from the user's inputs or the state of the activity environment.

(b) Functional Interrelationships/Examples

Referring to the flowchart depicted in FIG. 3, a user 300 wears a brain-monitoring module 302 which provides data regarding the brain state of the user 300. In one aspect, the brain-monitoring module 302 comprises a monitor for obtaining electroencephalogram (EEG) signals from the user 300 as well as an EEG decoder 304 for assessing the brain state of the user 300 and an EEG action interpreter 306 for associating the brain state of the user 300 with an action to be taken. As shown, the EEG action interpreter 306 receives information in the form of decoded brain states from the EEG decoder 304 as well as explicit user inputs from the user 300.

In the context of a video scene presented to the user 300, where purpose of the invention is to assist the user in making contextually-relevant decisions, a subliminal stimulus module 308 is used to generate contextually appropriate decision-related stimuli that are unobtrusive to the user 300, and which are used to alter the video scene in a manner that minimizes the perceptual (mental/cognitive) load impact on the user 300. This is accomplished through an altered perceptual experience module 310 in which an original video scene, depicting a continuous, asynchronous, interactive activity 312 is altered by the altered perception module 310 to incorporate contextually appropriate and unobtrusive decision-related stimuli to facilitate decision-making by the user. The user 300 affects the interactive activity 312 both explicitly through user inputs and implicitly through information generated by the brain-monitoring module 302.

In order to assure that decision-related stimuli from the subliminal stimulus module 308 are properly associated with EEG signal responses from the user 300, synchronization information is passed between the subliminal stimulus module 308 and the brain-monitoring module 302.

Figure 4:
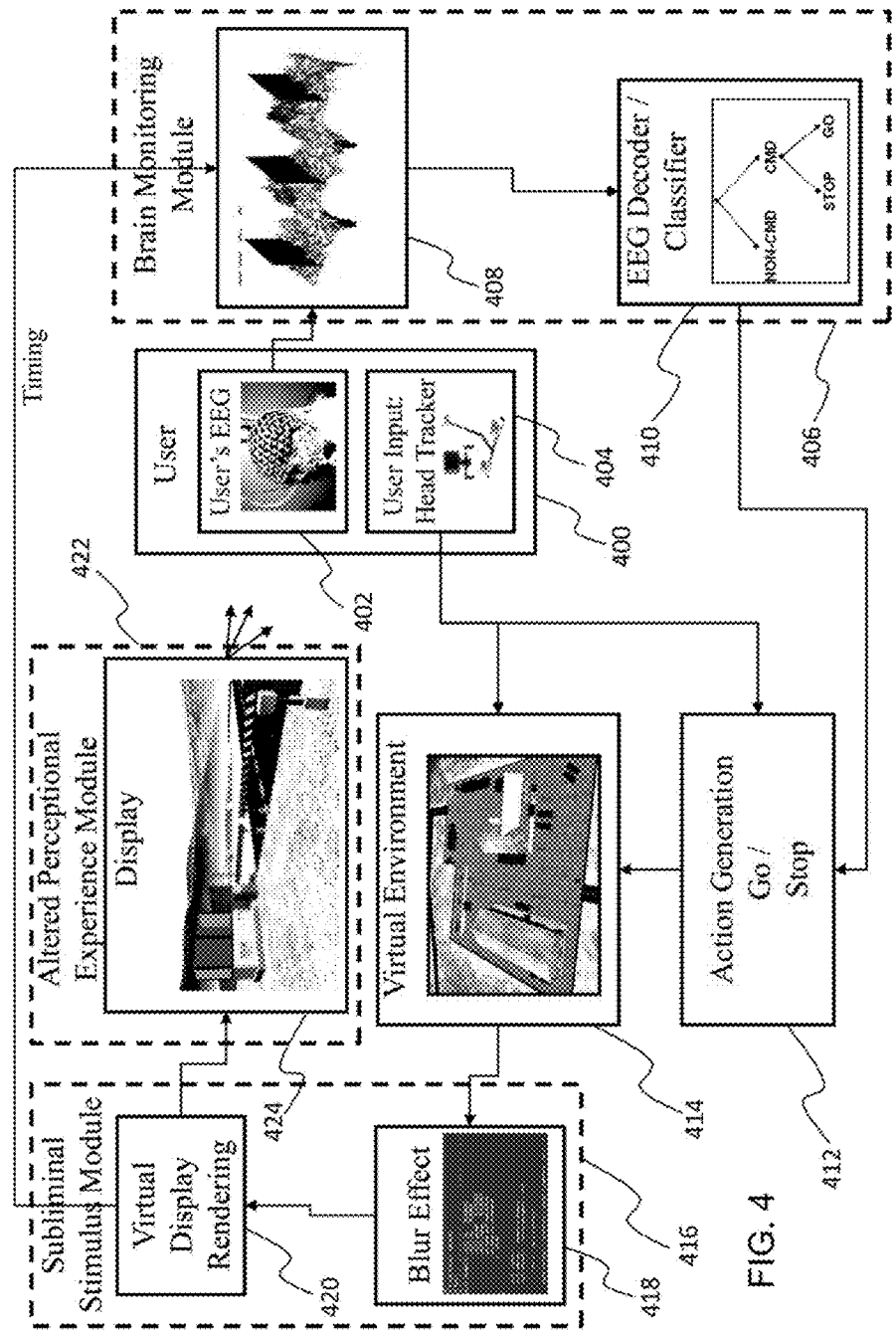
FIG. 4 is another flow chart depicting the interrelationships between various components of a more specific example of the present invention.

A more specific implementation of the invention is shown in FIG. 4, where a user 400 wears an EEG signal sensor 402 and where additional user input is received from a head tracker 404 that receives user input by monitoring the position and orientation of the user's head. In this example, the user 400 is able to navigate through a three-dimensional virtual environment. The continuous, asynchronous activity in this example is the user 400 looking around and exploring a virtual environment in a free-roaming mode that is determined by the user 400. The heading and viewing direction are controlled by the user 400 via the head tracker 404. Commands for "GO" and "STOP" are generated through the brain monitoring module 406 by analyzing EEG signal segments developed by an EEG segmentation module 408 in an EEG decoder/classifier 410. The EEG decoder/classifier 410 is trained to classify three brain-states: intention to go, intention to stop, and no intention. The "GO" and "STOP" commands are interpreted by the action generation module 412 in a movement paradigm. The interpretation may make use of contextual information from the head tracker 404 or the state of the virtual environment 414. For example, certain head movement patterns may be an indication that the user 400 is unlikely to intend to issue a command. It is not required that there be a one-to-one mapping between classifiable brain-states and actions; depending on the context, one brain-state may be interpreted as more than one action or may be ignored. In the movement paradigm, the user's position is initially still and remains still until a "GO" command is issued, at which time the user 400 begins to move in the direction of the user's view at the time the command is issued. Subsequent "GO" commands update the direction of movement again to the viewing direction. Conceptually, this is the same as going with a change of direction. A "STOP" command at any time stops the user's movement. At all times the user 400 is free to change the viewing direction and look around using the head tracker 404. This enables behaviors such as moving in one direction and looking in another.

The decision-related stimulus generated by the subliminal stimulus module 416 in this case is a blurring effect 418 generated by a virtual display rendering 420 on a small rectangular region of the visuals rendered in the virtual environment 414. This blurring is then applied in the altered perceptual experience module 422 to generate a display 424 for the user 400 that depicts the scene with the blurring effect. Timing information regarding the blurring effect 418 is used to determine an appropriate length for the EEG signal segments 408. The goal of the blurring effect is to subtly alert the user to something in the environment where an action may be desired. In order to facilitate the subtleness of the blur in this example, the duration of the blur is set to approximately 100 ms, with approximately 800 ms of delay between consecutive blurs. The effect is subtle (subliminal), such that it does not substantially interfere with performing the navigation task yet can be seen by the user when looking for it. The timing information regarding the onset time and duration of the subliminal stimuli is conveyed to the EEG segmentation module 408, which can capture the user's EEG with respect to the exact time and duration the altered visual display was presented to the user. The result is a series of EEG segments, which can then be classified using any event related potential (ERP) analysis technique, non-limiting examples of which were described by Luck, Steven J. in "An introduction to the event-related potential technique," 2005, and Tian-tian, X. and Xiao-xi, G. and Hong-shu, J., "Clinical application of event related potential P300," Journal of Clinical Rehabilitative Tissue Engineering Research (2008), both of which are incorporated by reference as though fully set forth herein.

Figure 5:
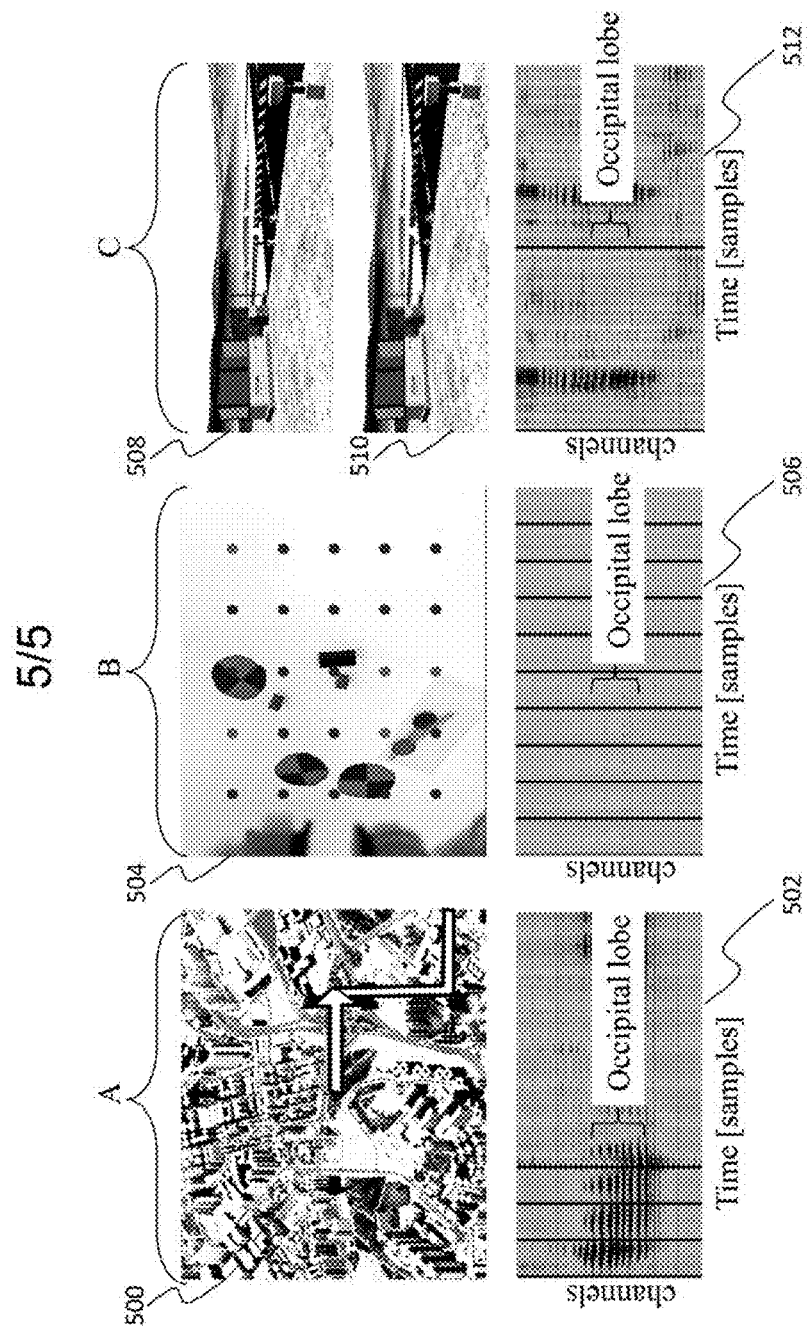
FIG. 5 is a set of images depicting various decision-related stimuli and their corresponding effect on the occipital lobe of a user's brain, representing cognitive load on the user.

In order to use a time-locked stimulus while performing an asynchronous, continuous activity, the stimulus needs to be unobtrusive and subtle enough that it does not substantially interfere with the user's performance in the activity. For visual stimuli, one EEG-based metric that can be used is occipital lobe stimulation. In typical rapid serial visual presentation (RSVP), each successive visual stimulus evokes a response in the visual cortices within approximately 100 ms of the stimulus onset. Experiment A in FIG. 5 shows an RSVP navigation paradigm where four arrows corresponding to movement directions are flashed in sequence over an image 500. The average stimulus response 502 is shown with black lines marking the stimulus onsets. An activation of the occipital lobe clearly follows each stimulus onset. Experiment B shows an image 504 of an RSVP goal selection paradigm where each dot represents a possible goal and groups of dots are rapidly and serially flashed to evoke a response when the user's target dot is flashed. Again the occipital lobe activation as measured by EEG is synchronized with the stimulus onsets, as can be seen in EEG image 506. Experiment C uses an unobtrusive blurring stimulus for synchronizing evoked potentials in a virtual navigation task. Images 508 and 510 depict clear and blurred scenes, respectively. The average EEG stimulus response in this case, depicted by image 512, does not show strong occipital lobe activation within 100 ms of the stimulus onsets, indicating that the user is not visually distracted or disrupted from attending to the navigation activity.

As described, the present invention combines the use of a subliminal stimulus to provide a synchronization of brain state and a temporal window in which the brain state is analyzed. The combination of time-locked stimulation with an asynchronous task brings the advantages of stimulus time-locked ERP analysis seen in synchronous tasks such as RSVP to asynchronous tasks such as motor control or navigation. Two advantages of time-locked ERP analysis are higher accuracy/performance in decoding and freedom from the constraint that the user must constantly generate brain states for continuous control. One embodiment may use this ERP analysis to simply define the temporal window, but still allow a continuously varying signal to be decoded from that window. Another embodiment can use the ERP analysis with a discrete classifier where brain state is decoded into specific states; as was described in detail previously.

In the present invention, the use of a subliminal stimulus can be selectively attended to by the user, so that the user can choose to inspect objects using free gaze without forcibly engaging the BMI decoding. This invention incorporates time-locking with subliminal stimuli because stimulus-driven responses in ERP analysis are accurate and have been used in clinical diagnosis using EEG, whereas non-stimulus driven signals have not. One potential application of the present invention is to improve the prior art by using the subliminal stimulus during image searching without the use of eye tracking for ERP analysis (however using the eye tracking signal for locating gaze is still possible).

In the present invention, the use of a single, generic stimulus that does not change can be used to simplify the task. Examples of visual decision-related stimuli include blurring a relevant portion of a scene, pointers indicating a relevant portion of a scene, dots indicating a relevant portion of a scene, altering the color scheme of a relevant portion of an image. Further, as discussed previously, the decision-related stimulus has a start point and a stop point. The start point and stop points are chosen to be contextually appropriate and useful while presenting minimal cognitive load for the user. The decision-related stimuli can be repeatedly presented between the start point and stop point (e.g., turned on and off in a repeating sequence).

Additionally, different decision-related stimuli have different levels of obtrusiveness to a user. In different situations, where a decision is more or less important, the level of obtrusiveness may be varied to reflect the importance/context of the decision-related stimuli. Obtrusiveness may be affected by the start point and stop point selected for the decision-related stimuli, by the type of stimuli, by a strength measure of the stimuli (e.g., loudness of a sound, brightness of a color, etc.), by the frequency of display of the stimuli (e.g., fast blinking vs. slow blinking), or a combination of such factors. Generally, obtrusiveness or unobtrusiveness is a measure of distraction or cognitive load, which takes away from a user's ability to perform important tasks, and which may be varied according to a particular context and the relative importance of a given decision.

Since the present invention uses a generic stimulus which can be selectively attended to by the user, the user is free to engage in other tasks and engage the BMI task when desired. The stimuli in single stimulus RSVP is all the information in the task, and the stimuli in multiple RSVP represent other choices or commands such as spatial location or movement direction. With the present invention, the stimulus itself does not contain any information. This feature, combined with the fact that there is less visual stimulation during the task, causes less fatigue for the user compared to multiple stimuli RSVP.

What is claimed is:

1. A brain-machine interface for extracting user action intentions while navigating a continuous three-dimensional asynchronous interactive environment, the interface comprising:
   one or more processors and a memory, the memory having instructions encoded thereon such that upon execution of the instructions, the one or more processors perform operations of:
   processing brain activity of a user engaged in navigating a three-dimensional video environment, wherein the user navigates the three-dimensional video environment while simultaneously being monitored;
   generating subliminal stimuli for presentation to a user;
   modifying the user's perceived experience while navigating the continuous three-dimensional asynchronous interactive environment through presentation of the subliminal stimuli when the user is required to make a decision regarding an action to be performed by the user in the continuous three-dimensional asynchronous interactive environment, wherein the subliminal stimuli are presented at predetermined time points;
   assessing the user's brain activity during presentation of the subliminal stimuli to relate the user's brain activity to the modification of the user's perceived experience at the predetermined time points; and
   classifying the user as having at least one brain state in a set of brain states by interpreting the user's brain activity in relation to the subliminal stimuli presented at the predetermined time points to determine whether the action is an action intended by the user,
   wherein the set of brains states comprises an intention to go state, an intention to stop state, and a no intention state.

2. A brain-machine interface as set forth in claim 1, wherein the stimuli is selected from a group consisting of visual stimuli, auditory stimuli, tactile stimuli, and olfactory stimuli.

3. A brain-machine interface as set forth in claim 2, where the stimuli is a visual stimuli selected from a group consisting of blurring a relevant portion of a scene, pointers indicating a relevant portion of a scene, dots indicating a relevant portion of a scene, and altering a color scheme of a relevant portion of an image.

4. A brain-machine interface as set forth in claim 2, wherein the stimuli has a start point and a stop point.

5. A brain-machine interface as set forth in claim 4, wherein the stimuli is repeatedly presented between the start point and stop point.

6. A brain-machine interface as set forth in claim 1, wherein the stimuli have a level of distraction to the user, and wherein the level of distraction is varied according to the context of the stimuli.

7. A brain-machine interface as set forth in claim 1, wherein the stimuli have a type, and wherein the type of stimuli is varied according to the context.

8. A brain-machine interface as set forth in claim 1, wherein an electroencephalogram (EEG) is used to assess a user's brain activity via an EEG signal.

9. A brain-machine interface as set forth in claim 8, wherein the EEG signal is divided into time segments which are appropriate for assessing the user's brain activity in response to the stimuli.

10. A brain-machine interface as set forth in claim 9, wherein a EEG decoder/classifier is used to determine whether the action is intended by the user.

11. A brain-machine interface as set forth in claim 1, wherein the one or more processors further perform an operation of evoking user actions within the continuous asynchronous interactive environment when the user's brain activity indicates that a decision is made based on the stimuli.

12. A brain-machine interface method for extracting user action intentions within a continuous asynchronous interactive environment, the method comprising acts of:
   processing brain activity of a user engaged in navigating a three-dimensional video environment, wherein the user navigates the three-dimensional video environment while simultaneously being monitored;
   generating subliminal stimuli for presentation to a user;
   modifying the user's perceived experience while navigating the continuous three-dimensional asynchronous interactive environment through presentation of the subliminal stimuli when the user is required to make a decision regarding an action to be performed by the user in the continuous three-dimensional asynchronous interactive environment, wherein the subliminal stimuli are presented at predetermined time points;

assessing the user's brain activity during presentation of the subliminal stimuli to relate the user's brain activity to the modification of the user's perceived experience at the predetermined time points; and classifying the user as having at least one brain state in a set of brain states by interpreting the user's brain activity in relation to the subliminal stimuli presented at the predetermined time points to determine whether the action is an action intended by the user, wherein the set of brains states comprises an intention to go state, an intention to stop state, and a no intention state.

13. A brain-machine interface method as set forth in claim 12, wherein the stimuli is selected from a group consisting of visual stimuli, auditory stimuli, tactile stimuli, and olfactory stimuli.

14. A brain-machine interface method as set forth in claim 13, where the stimuli is a visual stimuli selected from a group consisting of blurring a relevant portion of a scene, pointers indicating a relevant portion of a scene, dots indicating a relevant portion of a scene, and altering a color scheme of a relevant portion of an image.

15. A brain-machine interface method as set forth in claim 13, wherein the stimuli has a start point and a stop point.

16. A brain-machine interface method as set forth in claim 15, wherein the stimuli is repeatedly presented between the start point and stop point.

17. A brain-machine interface method as set forth in claim 12, wherein the stimuli have a level of distraction to the user, and wherein the level of distraction is varied according to the context of the stimuli.

18. A brain-machine interface method as set forth in claim 12, wherein the stimuli have a type, and wherein the type of stimuli is varied according to the context.

19. A brain-machine interface method as set forth in claim 12, wherein an electroencephalogram (EEG) is used to assess a user's brain activity via an EEG signal.

20. A brain-machine interface method as set forth in claim 19, wherein the EEG signal is divided into time segments which are appropriate for monitoring the user's brain activity in response to the stimuli.

21. A brain-machine interface method as set forth in claim 20, wherein an EEG decoder/classifier is used to determine whether the action is intended by the user.

22. A brain-machine interface method as set forth in claim 12, wherein the data processor further performs an operation of evoking user actions within the continuous asynchronous interactive environment when the user's brain activity indicates that a decision is made based on the stimuli.

23. A brain-machine interface computer program product for extracting user action intentions within a continuous asynchronous interactive environment, the computer program product comprising computer-readable instructions stored on a non-transitory computer-readable medium that are executable by a computer having a processor for causing the processor to perform operations of:

processing brain activity of a user engaged in navigating a three-dimensional video environment, wherein the user navigates the three-dimensional video environment while simultaneously being monitored;

generating subliminal stimuli for presentation to a user;

modifying the user's perceived experience while navigating the continuous three-dimensional asynchronous interactive environment through presentation of the subliminal stimuli when the user is required to make a decision regarding an action to be performed by the user in the continuous three-dimensional asynchronous interactive environment, wherein the subliminal stimuli are presented at predetermined time points;

assessing the user's brain activity during presentation of the subliminal stimuli to relate the user's brain activity to the modification of the user's perceived experience at the predetermined time points; and classifying the user as having at least one brain state in a set of brain states by interpreting the user's brain activity in relation to the subliminal stimuli presented at the predetermined time points to determine whether the action is an action intended by the user, wherein the set of brains states comprises an intention to no state, an intention to stop state, and a no intention state.

24. A brain-machine interface computer program product as set forth in claim 23, wherein the stimuli is selected from a group consisting of visual stimuli, auditory stimuli, tactile stimuli, and olfactory stimuli.

25. A brain-machine interface computer program product as set forth in claim 24, where the stimuli is a visual stimuli selected from a group consisting of blurring a relevant portion of a scene, pointers indicating a relevant portion of a scene, dots indicating a relevant portion of a scene, and altering a color scheme of a relevant portion of an image.

26. A brain-machine interface computer program product as set forth in claim 24, wherein the stimuli has a start point and a stop point.

27. A brain-machine interface computer program product as set forth in claim 26, wherein the stimuli is repeatedly presented between the start point and stop point.

28. A brain-machine interface computer program product as set forth in claim 23, wherein the stimuli have a level of distraction to the user, and wherein the level of distraction is varied according to the context of the stimuli.

29. A brain-machine interface computer program product as set forth in claim 23, wherein the stimuli have a type, and wherein the type of stimuli is varied according to the context.

30. A brain-machine interface computer program product as set forth in claim 23, wherein an electroencephalogram (EEG) is used to assess a user's brain activity via an EEG signal.

31. A brain-machine interface computer program product as set forth in claim 30, wherein the EEG signal is divided into time segments which are appropriate for assessing the user's brain activity in response to the stimuli.

32. A brain-machine interface computer program product as set forth in claim 31, wherein an EEG decoder/classifier is used to determine whether the action is intended by the user.

33. A brain-machine interface computer program product as set forth in claim 23, further comprising instructions for causing the data processor to perform an operation of evoking user actions within the continuous asynchronous interactive environment when the user's brain activity indicates that a decision is made based on the stimuli.

* * * * *